Feb. 11, 1930.  W. M. RUSH  1,747,086
SAW SET
Filed Aug. 14, 1928
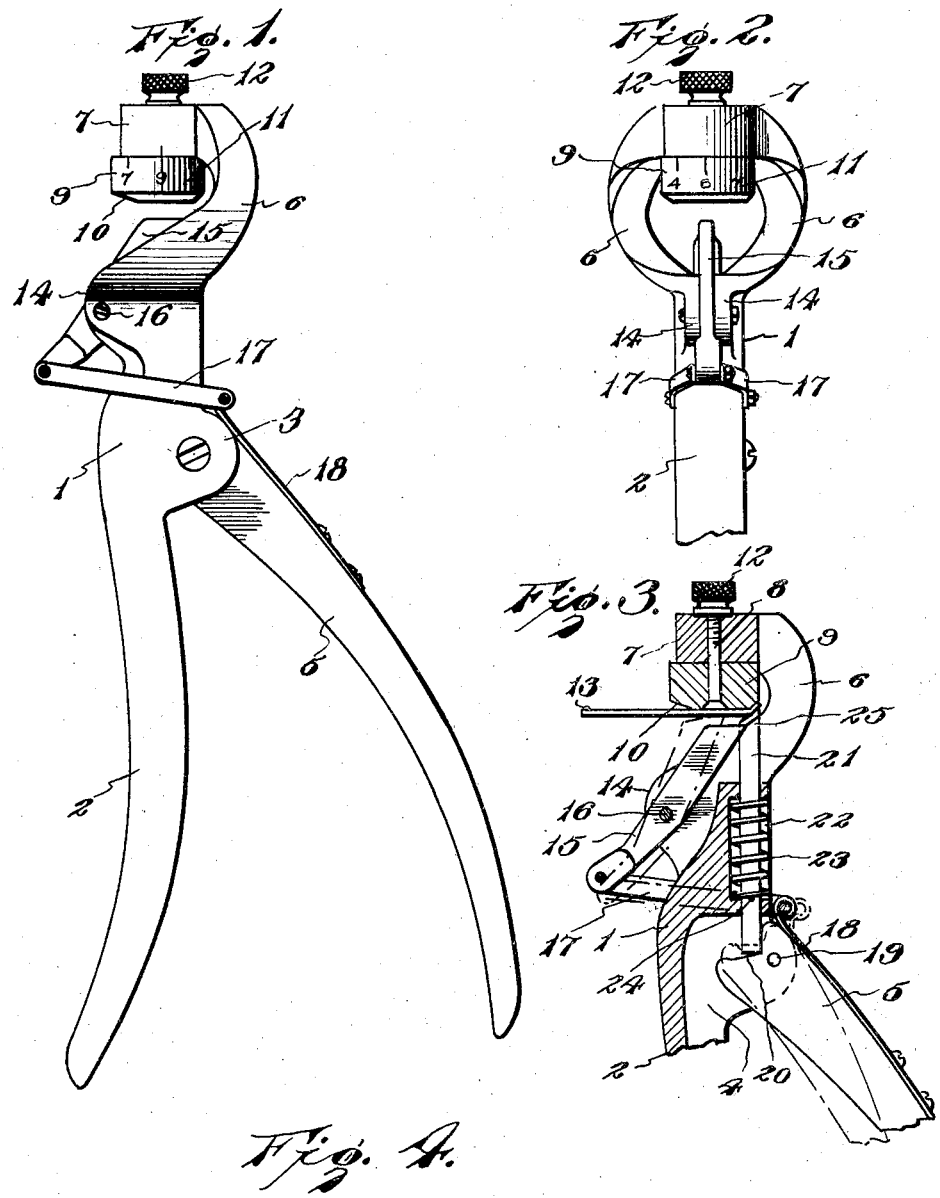
INVENTOR.
W. M. Rush
BY
Lacey & Lacey, ATTORNEYS Patented Feb. 11, 1930

1,747,086

UNITED STATES PATENT OFFICE

WILLIAM M. RUSH, OF PITTSBURGH, PENNSYLVANIA

SAW SET

Application filed August 14, 1928. Serial No. 299,624.

This invention is a hand tool by the use of which saw teeth may be set to a desired pitch easily and quickly and the saw blade will be held firmly while the tooth is being set. The invention is illustrated in the accompanying drawing and will be hereinafter fully set forth and particularly defined.

In the drawing:

Figure 1 is an elevation of a saw-setting tool embodying the improvements;

Fig. 2 is a view at a right angle to Fig. 1;

Fig. 3 is a longitudinal section, and

Fig. 4 is a detail bottom plan view of the anvil.

In carrying out the invention, there is provided a body 1 having one end portion 2 shaped to be conveniently grasped by the fingers of the operator's hand and provided between its ends with offset perforated lugs or ears 3, as clearly shown in Fig. 1. As shown most clearly in Fig. 3, this body member is recessed or grooved longitudinally of the handle portion, as shown at 4, whereby a cooperating lever or handle member 5 will be accommodated. Extending from the body member in a direction away from the handle are spaced arms 6 which are of arcuate form and are joined at their extremities by a circular web 7 through which extends a screw or bolt 8 carrying the anvil 9. The anvil has the edge of its lower or inner face beveled, as shown at 10, and this bevel is of varying degrees of inclination so that by rotating the anvil and then securing it in a set position a bevel of any desired degree may be presented to the saw tooth. The anvil is provided upon its periphery with numerals 11 indicating different degrees of inclination so that it may be accurately adjusted. The bolt or screw 8 projects through the top or outer end of the circular web 7 and is equipped with a set nut 12 whereby the anvil may be secured in any position in which it may be set.

As shown most clearly in Fig. 3, the arms 6 are so shaped that they will bridge the saw blade, indicated at 13, and at their junction with the body they are formed with offsets or lugs 14 between which a brace 15 is pivoted, as indicated at 16. This brace is adapted to bear against the side of the saw blade and hold it firmly against the lower flat face of the anvil, as will be understood upon reference to Fig. 3, and, to operate the brace, links 17 are pivoted thereto and pass around the end of the body 1 to be hingedly connected to a leaf spring 18 secured upon the outer side of the handle member 5, as shown. This handle member is pivoted eccentrically, as shown at 19, between the offsets or lugs 3 of the body and has its end notched or recessed, as shown at 20, in such form that it is adapted to bear against and actuate the setting pin or plunger 21. The pin or plunger 21 is slidably mounted in the body and extends through a recess 22 therein, a coiled spring 23 being disposed within said recess around the plunger and bearing at its ends against the forward end of the recess and an abutment pin 24 on the plunger whereby the plunger is yieldably held retracted and in constant contact with the cam or eccentric notch 20 of the lever 5. The end of the plunger is beveled, as indicated at 25, to impinge against the saw tooth and press the same into close contact with the beveled edge of the anvil and thereby give the desired set or pitch to the tooth.

It will be readily understood that the tool is brought into such relation to the saw blade that the blade will extend between the anvil and the brace and plunger, the supporting arms 6 spanning the saw and holding the parts in proper relation thereto. The handle or lever member 5 is then pressed toward the handle portion 2 of the body by pressure of the operator's fingers and hand and the lever will be thereby caused to rock about its pivot 19 and swing the leaf spring 18 outwardly away from the body, a pull being transmitted through the link 17 to the lower or outer end of the brace 15 and the brace being consequently rocked so that its free end will engage against the saw blade, as will be understood upon reference to Fig. 3. The rocking of the handle or lever member 5 also imparts a longitudinal sliding movement to the plunger or setting pin so that it is pressed toward the saw blade to impinge against the tooth but the parts are so arranged and shape that the brace will engage the saw blade prior to the engagement thereof by the setting pin and will consequently hold the blade very firmly while the tooth is being set. This relative movement of the brace and the pin is accomplished by the shape of the notch 20 and the spring 18 will yield sufficiently to the additional movement of the handle to permit the same to occur and completely project the plunger or setting pin without disturbing the brace. When the pressure upon the handle member is released, the spring 23 immediately expands and returns the parts to the initial position. The tool is then shifted along the saw blade to the next tooth to be set and the operation repeated.

It will be noted that I have provided an exceedingly simple and compact tool which is light and may be easily manipulated. When the beveled free end of the brace 15 impinges against the saw blade, it will firmly clamp the same against the anvil 9 so that it will be held thereto and the tooth to be set placed in such position relative to the anvil that the plunger will operate to impart the same pitch to all the teeth. The plunger is housed by the body and the arms 6 so that it is not apt to be dislodged or damaged in any way and the brace and the links connected thereto set close to the body so that they are not apt to come into damaging contact with extraneous objects.

Having thus described the invention, I claim:

1. A hand tool comprising a body, an anvil mounted on the body, a brace pivotally mounted between its ends on the body in spaced relation to the anvil and arranged to have one end cooperate therewith, a handle member pivotally mounted upon the body, links pivoted to the brace at the end thereof remote from the anvil and yieldably connected with the handle member, and a setting pin engaged by the handle member.

2. A hand tool comprising a body, an anvil mounted thereon, a brace pivoted between its ends on the body in spaced relation to the anvil and arranged to have one end cooperate therewith to hold a saw blade thereto, a handle member pivoted in the body and having a cam face at its end, yieldable connections between the handle member and the brace more remote from the anvil, a setting pin slidably mounted in the body and having its inner end bearing against the cam face at the end of the handle member, and yieldable means holding the setting pin retracted and in contact with the handle member.

3. A hand tool comprising a body, an anvil mounted thereon, a brace pivotally mounted between its ends on the body and having one end arranged to cooperate with the anvil to hold a saw blade against the same, a handle member pivoted to the body and having a cam surface on its pivoted end, a spring on the handle at its pivoted end, links connecting said spring with the end of the brace more remote from the anvil, and a setting pin slidably mounted in the body and having its inner end seated on the cam surface on the handle member.

In testimony whereof I affix my signature.

WILLIAM M. RUSH. [L. S.]